Jan. 2, 1962　　SEIICHI HONDA ET AL　　3,015,789
MECHANICAL FILTER
Filed April 16, 1957　　2 Sheets-Sheet 2

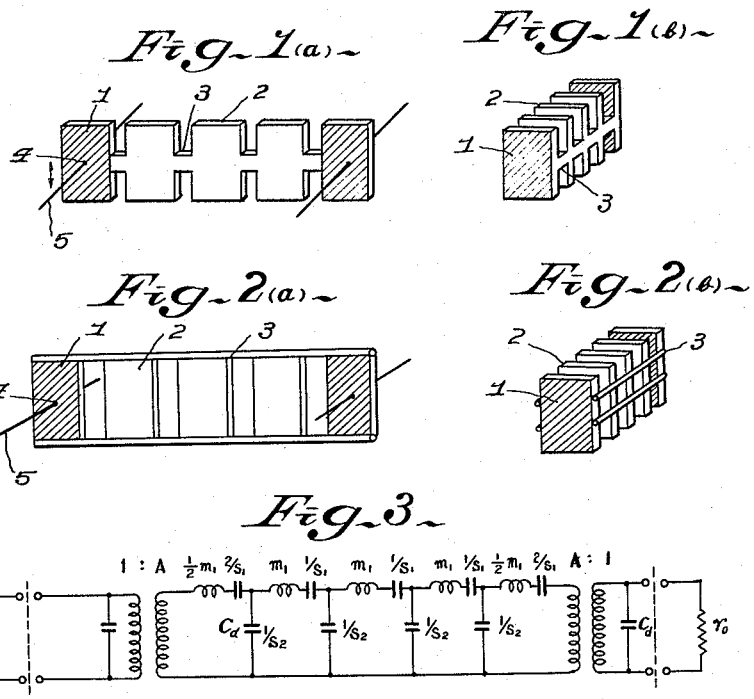
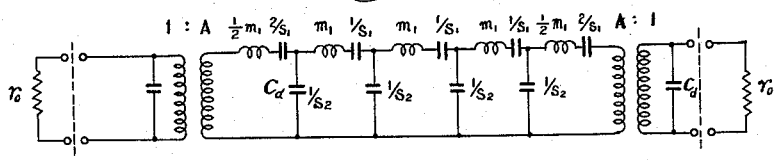
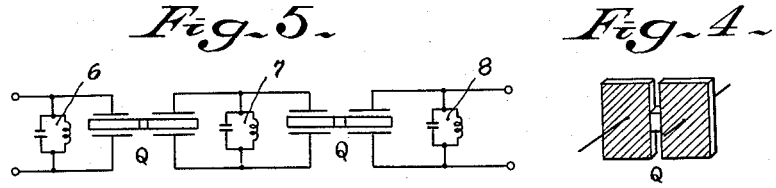
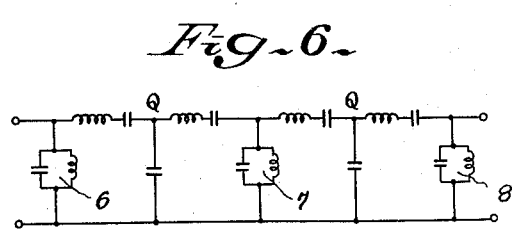

Inventors
SEIICHI HONDA &
YUZO NAKAZAWA
BY Otto John Munz
Attorney

United States Patent Office 3,015,789
Patented Jan. 2, 1962

3,015,789
MECHANICAL FILTER
Seiichi Honda, Hitachi-shi, Ibaragi-ken, and Yuzo Nakazawa, Kawasaki-shi, Kanagawa-ken, Japan, assignors to Toyotsushinki Kabushiki Kaisha (known as Toyo Communication Equipment Co., Ltd.), Kawasaki-shi, Japan
Filed Apr. 16, 1957, Ser. No. 653,190
3 Claims. (Cl. 333—72)

This invention relates to an improvement of an electro-mechanical filter.

An essential object of this invention is to provide an electro-mechanical filter having a remarkably sharp cut-off frequency characteristic.

Another object of this invention is to provide an electro-mechanical filter having a sufficient mechanical strength while employing members made of relatively weak quartz crystal, having remarkably sharp cut-off frequency characteristics.

The principle, construction and operation of this invention, together with further objects and advantages thereof, may best be understood by reference to the following description, taken in connection with the accompanying drawings, in which:

FIG. 1(a) is a perspective view of an example of this invention, in which five elements are cascaded.

FIG. 1(b) is a perspective view showing a modification of the example in FIG. 1(a).

FIG. 2(a) and FIG. 2(b) are perspective views showing, respectively, other modifications of the examples in FIG. 1(a) and FIG. 1(b).

FIG. 3 is an equivalent electrical circuit diagram of the examples in FIGS. 1(a), 1(b), 2(a) and 2(b).

FIG. 4 is a perspective view of an element having the simplest construction of a further example of this invention.

FIG. 5 is a schematic connection view of this invention, in which the elements illustrated in FIG. 4 are used as the essential elements.

FIG. 6 is an equivalent electrical circuit diagram of the example in FIG. 5.

Figure 7A:
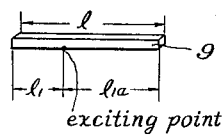
Figure 7B:
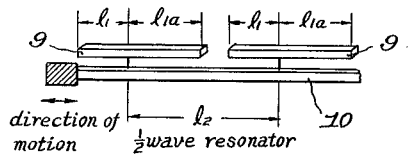

FIG. 7(a) is a perspective view of a part of the example in FIG. 7(b).

FIG. 7(b) is a perspective view of a still further example of this invention, showing the principle of the M-derived type electro-mechanical filter.

Figure 7C:
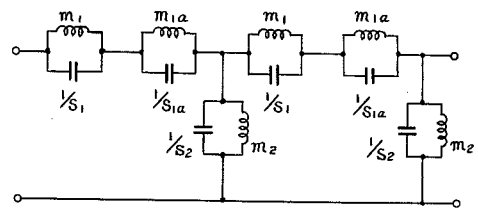

FIG. 7(c) is an equivalent electrical circuit diagram of the example in FIG. 7(b).

Figure 8A:
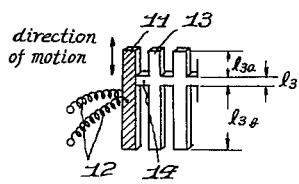
Figure 9A:
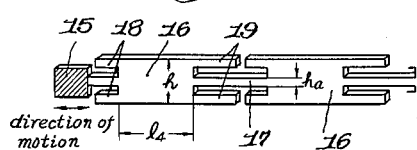

FIG. 8(a) and FIG. 9(a) are perspective views of two other examples of this invention.

Figure 8B:
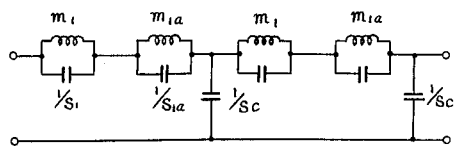
Figure 9B:
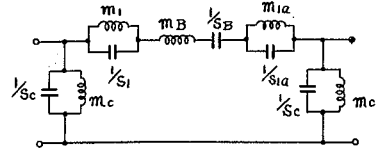

FIG. 8(b) and FIG. 9(b) are equivalent electrical circuit diagrams of the examples in FIGS. 8(a) and 9(a), respectively.

Figure 9C:
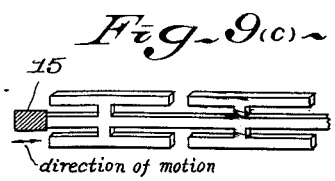

FIG. 9(c) is a perspective view of a modification of the example in FIG. 9(a).

Figure 10:
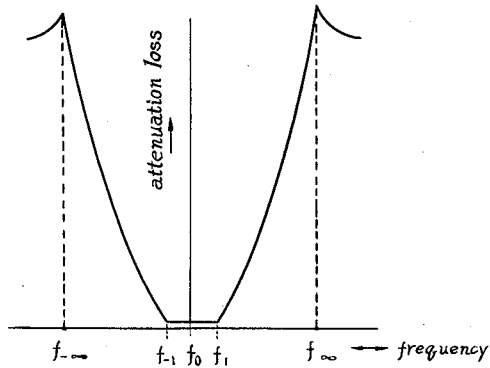

FIG. 10 is a frequency-attenuation characteristic of the example in FIG. 8(a).

In the drawings, the same members are indicated by the same numerals or symbols throughout.

Each of the electro-mechanical filters illustrated in FIGS. 1(a) and 1(b) is composed of transducers 1, resonators 2, and couplers 3, which are formed as one block by cutting off piezoelectric materials such as a quartz crystal piece.

Each of the electro-mechanical filters illustrated in FIGS. 2(a) and 2(b) is composed of transducers 1, resonators 2, and couplers 3, which are coupled in cascade to form a block of five stages, the said transducers and resonators being made of a material such as quartz crystal and the said couplers being made of a suitable material.

The members 1 and 2 form the quartz crystal vibrators, vibrating usually in the longitudinal mode, and the orientations thereof are selected to accommodate to the desirable frequency and temperature characteristics of the said members. Of course, determination of the orientations and forms of the said members 1 and 2 may be modified in accordance with the vibration modes such as longitudinal vibration, bending vibration, torsional vibration, thickness vibration, lateral vibration and the like.

The transducer 1 and the resonator 2 have the same form. They are plated on both the front and rear surfaces thereof, as indicated by oblique lines, to make electrodes on the said surfaces. A solder cone 4 is attached to the vibration nodal point of each said surface and at these points are soldered supporting lead wires 5 which are the electrical terminal of said electro-mechanical filter. The coupler 3 is connected to a point near the nodal point of vibration of the transducer and resonator. In the conventional mechanical filter, for the purpose of obtaining a narrow band pass filter, the sectional area of the coupler must be selected to be very narrow, thus causing the filter to be mechanically weak.

However, when the connection is made at the point near the nodal point, rather than at the nodal point, as in the case of this invention, use of the coupler having a large sectional area for the narrow band pass filter is made possible. Consequently, even when mechanically weak material such as a quartz crystal is used as the coupler, it has strength sufficient for practical use.

The equivalent electrical circuit of the electro-mechanical filter of the five stage type illustrated in FIGS. 1(a), 1(b) and FIGS. 2(a), 2(b) can be indicated as shown in FIG. 3, in which the members $m$ and $s$, are, respectively, an equivalent mass and an equivalent stiffness which form a series resonance circuit, the said resonance circuits being coupled by a stiffness $s_2$, and a transducer having an electro-mechanical conversion rate 1:A being connected with each of two ends of the resultant equivalent circuit.

The operation and character of the circuit in FIG. 3 in the case of near resonance frequency will be described in the following in connection with a band pass filter.

When the cut-off frequencies, center frequency, terminal impedance, and damped capacity of the transducer are taken, respectively as $f_{-1}$ and $f_1$, $f_0 = \sqrt{f_{-1} \cdot f_1}$, $r_0$, and $C_d$, the following equations will be obtained.

$$\left. \begin{array}{l} m_1 = \dfrac{r_0}{\pi(f_1 - f_{-1})} \\[6pt] s_1 = \dfrac{4\pi f^2_{-1} r_0}{f - f_{-1}} \\[6pt] s_2 = \pi(f_1 + f_2)r_0 = \dfrac{1}{4}\dfrac{(f_1 + f_{-1})(f_1 - f_{-1})}{f_{-1}^2} s_1 \end{array} \right\} \quad (1)$$

If the pass bandwidth is narrow, the following relation will be obtained.

$$\frac{s_2}{s_1} = \frac{2\pi(f_1 - f_{-1})}{f_1} \quad (2)$$

When the resonators vibrate in the longitudinal direction, the equivalent lumped constants $m_1$ and $s_1$ of a mechanical resonator of ½ wave length will be given by the following equations.

$$\left. \begin{array}{l} m_1 = \dfrac{1}{2}\rho S_1 l_1 \\[6pt] s_1 = 4.93 \dfrac{ES}{l_1} \\[6pt] f_{-1} = \dfrac{1}{2l_1}\sqrt{\dfrac{E}{\rho}} \end{array} \right\} \quad (3)$$

where $\rho$, $E$, $S_1$ and $l_1$ indicate, respectively, density, rigidity modulus, sectional area, and length of vibrating direction of the said resonator.

The coupling stiffness $s_2$ is determined by the distance between the adjacent resonators, and the dimension and material of the resonator. For instance, if any longitudinal vibration is to be transmitted to the resonator of the next stage, the coupling stiffness $s_{2a}$ will be indicated by the following equation.

$$s_{2a} = \frac{E_2 S_2}{l_2} \quad (4)$$

where $S_2$, $l_2$ and $E_2$ are, respectively, sectional area, length of vibrating direction, and rigidity modulus of the coupling stiffness.

In the example in FIG. 1(a), when the filter vibrates laterally, the coupling stiffness is determined by the coupling point of the coupler with the resonator.

For instance, when the resonators are coupled by the couplers in such a manner that vibration force is transmitted to the next resonator by the length of vibrating direction of the coupler at the neutral surface of the vibration nodal point of the resonator, the coupling stiffness $s_{2b}$ will be indicated by the following equation.

$$s_{2b} = \frac{\pi^2}{12} G \frac{t l_2}{b_2} \cdot \frac{l_2^2}{l_1^2} \quad (5)$$

where $G$, $l_2$, $b_2$, and $t$ are, respectively, rigidity modulus, length of vibrating direction, width of the coupler and thickness of the coupler illustrated in FIGS. 1(a) and 1(b).

As will be seen from the Equations 2, 4 and 5, it is easily possible to make the bandwidth narrow or wide by suitable selection of the relative positions between the couplers and resonators, and their dimensions.

In FIG. 4 is shown a simple electro-mechanical filter Q of two stage type according to this invention. Such a mechanical filter of the minimum number of stages is simplest in its construction and can be made of a small quartz crystal piece. The electro-mechanical filter illustrated in FIG. 4 may be used for obtaining an electro-mechanical filter circuit by combination of electrical circuits 6, 7 and 8 with the said filters Q, as shown in FIG. 5. The said combined circuit can be indicated by the equivalent circuit as shown in FIG. 6, the inductances and capacitances of the said electrical circuit being, of course, determined by the bandwidth and characteristic impedance of the band pass filter to be constructed.

The above-mentioned electro-mechanical filters of this invention relate to the filters, the equivalent circuits of which are of constant K type and the like. However, the filter of this invention may be applied for the electro-mechanical filter such as the so-called M-derived type filter having attenuation poles in the attenuation frequency regions.

The attenuation per stage in the above-mentioned electro-mechanical filter is generally indicated by the following equation.

$$\coth^{-1} \sqrt{\frac{\omega_1^2 - \omega^2}{\omega_{-1}^2 - \omega^2}} \quad (6)$$

where $\omega_1$ and $\omega_{-1}$ indicate, respectively, the cut-off angular frequencies.

In the constant K type filter, six or more stages should be coupled in cascade in order to obtain the desired attenuation in the vicinity of cut-off frequency for ordinary use.

In the M-derived type filter, however, the attenuation per stage is indicated by the following equations.

$$\left. \begin{array}{l} \coth^{-1} \frac{1}{m} \sqrt{1 - \frac{1}{\Omega^2}} \\ \Omega = \frac{\omega_0}{\omega_1 - \omega_{-1}} \left( \frac{\omega}{\omega_0} - \frac{\omega_0}{\omega} \right) \\ m = \sqrt{1 - \frac{1}{\Omega^2_\infty}} \end{array} \right\} \quad (7)$$

where $\omega_0$ and $\omega_\infty$ indicate, respectively, the center angular frequency and $\Omega$ value at the attenuation pole.

The smaller the factor $m$ is selected, the nearer the attenuation pole can be brought to the cut-off frequency, whereby a sharp cut-off attenuation characteristic can be obtained.

When such an elastic piece 9 capable of being vibrated longitudinally as shown in FIG. 7(a) is excited at any point except the end points and center point thereof (i.e. dissymmetrically excited), two kinds of antiresonance frequencies determined by the elemental pieces corresponding to the lengths $l_1$ and $l_{1a}$ are produced.

By combination of the antiresonators 9 as described above with a parallel resonator 10 at the positions corresponding to ½ wave length $l_2$, a M-derived type electro-mechanical filter as shown in FIG. 7(b) can be constructed, the equivalent electrical circuit of the said filter being indicated in FIG. 7(c).

The pass bandwidths in the circuit in FIG. 7(c) can be, when the bandwidths are narrow, indicated approximately by the following equations.

$$\left. \begin{array}{l} B = \frac{\omega_1 - \omega_{-1}}{\omega_0} \\ b = \frac{\omega_\infty - \omega_{-\infty}}{\omega_0} \end{array} \right\} \quad (8)$$

where $\omega_{-1}$ and $\omega_1$, $\omega_{-\infty}$ and $\omega_\infty$, and $\omega_0$ indicate, respectively, cut-off angular frequencies, attenuation pole angular frequencies and center angular frequency.

When the equation $$m = \sqrt{1 - \frac{B^2}{b^2}}$$

is put in the Equation 8, the characteristic impedance is indicated by $r_0$, and the conditions $B \ll 1$ and $b \ll 1$ are adopted, the values of the elements in the circuit in FIG. 7(c) will be indicated by the following equations.

$$\left. \begin{array}{l} m_1 = \frac{m}{1 - m^2} \cdot \frac{B r_0}{\omega_0} \\ m_{1a} = \frac{m}{1 - m^2} \cdot \frac{1}{1 + b} \cdot \frac{B r_0}{\omega_0} \\ m_2 = \frac{1}{m} \cdot \frac{B r_0}{2 \omega_0} \\ s_1 = \frac{m}{1 - m^2} \cdot \frac{1}{1 + b} \omega_0 B r_0 \\ s_{1a} = \frac{m}{1 - m^2} \omega_0 B r_0 \\ s_1 = \frac{1}{m} \omega_0 B \frac{r_0}{2} \end{array} \right\} \quad (9)$$

Thus, the equivalent lumped constants are determined.

When such a resonator 9 capable of being vibrated longitudinally along the length $l$ thereof as shown in FIG. 7(a) is excited at any point except the end points and the center point, (i.e., dissymmetrically excited), the equivalent masses $m_1$, $m_{1a}$ and the equivalent stiffness $s_1$, $s_{1a}$ of the both elemental pieces corresponding to the lengths $l_1$ and $l_{1a}$ of the resonator 9 will be indicated by the following equations.

$$s_1 = 2 S_0; \quad s_{1a} = 2 S_{0a}$$

$$m_1 = \frac{8}{\pi^2} M_0; \quad m_{1a} = \frac{8}{\pi^2} M_{0a}$$

but $$S_0 = \frac{S}{l_1} = \frac{E A_1}{l_1}; \quad S_{0a} = \frac{S}{l_{1a}} = \frac{E_1 A_1}{l_{1a}} \quad (10)$$

$$M_0 = M l_1 = \rho_1 A_1 l_1; \quad M_{0a} = M l_{1a} = \rho_1 A_1 l_{1a}$$

where $A_1$, $\rho$, and $E_1$ indicate, respectively, the sectional area, density, and rigidity modulus of the resonator.

By coupling two of the said antiresonators 9 with a resonator 10 having ½ wave length as shown in FIG. 7(b), the M-derived type filter such as shown in FIG. 7(c) will be obtained.

Furthermore, if sectional area, density and rigidity modulus of the resonator 10 of ½ wave length are indicated, respectively, by $A_2$, $\rho$ and $E_2$, the following equations will be obtained.

$$\left. \begin{array}{l} m_2 = \dfrac{2}{\pi^2} \rho_2 A_2 l_2 \\[4pt] s_2 = 2 \dfrac{E_2 A_2}{l_2} \end{array} \right\} \quad (11)$$

When all parts composing the filter are made of the same material, particularly of quartz crystal, the construction thereof becomes simple according to the following equations.

$$\left. \begin{array}{l} A_1 \doteqdot \dfrac{m_2}{1-m^2}\left(1-\dfrac{b}{2}\right) A_2 \\[4pt] l_1 \doteqdot \dfrac{1}{2}\left(1+\dfrac{b}{2}\right) l_2 \\[4pt] l_{1a} \doteqdot \dfrac{1}{2}\left(1-\dfrac{b}{2}\right) l_2 \end{array} \right\} \quad (12)$$

In the example in FIG. 8(a), the equivalent circuit thereof being shown in FIG. 8(b), the transducer 11 made of quartz crystal is plated on both surfaces thereof with metal to form two electrodes and a supporting lead wire 12 is soldered to each electrode thereof. The resonators 13 and the coupler 14 are also made of quartz crystal vibrator. The coupling positions between the adjacent resonators should differ in accordance with the vibrating modes of the mechanical filter. However, it is generally preferable to couple the said members at a position somewhat separated from the vibration nodal point so as to obtain a resonator capable of operating as the resonator having two antiresonance frequencies.

The bandwidth can be determined by the relative relations between the coupler 14 and the dimension of the resonator 13.

In the case of the electro-mechanical filter illustrated in FIGS. 8(a) and 8(b), it is excited at the position within the width corresponding to the length $l_3$ of the coupler 14 (but, $l_{3a} \neq l_{3b}$), so that when the following stages are successively excited along the said width with a uniform force, two antiresonating circuits are obtained, whereby a circuit similar to the circuit of the M-derived type filter will be obtained.

In FIG. 9(a) is shown a modification of the electro-mechanical filter illustrated in FIG. 7(b), the equivalent electrical circuit thereof being indicated in FIG. 9(b).

In FIG. 9(a), the filter is made by combination of the exciter 15 capable of transmitting longitudinal vibration towards the longitudinal direction of the filter, series resonators 16 of ½ wave length, and couplers 17 of ½ wave length, the said filter corresponding to the combined filter of the series resonators 16 with an antiresonator composed of two elements 18 and 19.

The equivalent electrical circuit of the filter in FIG. 9(a) is shown in FIG. 9(b), in which the lumped elemental constants corresponding to the resonators 16 and couplers 17 are indicated, respectively, by $m_B$, $s_B$ and $m_C$, $s_C$ and the equivalent masses and the equivalent stiffnesses of two antiresonators are indicated by $m_1$, $m_{1a}$ and $s_1$ and $s_{1a}$, respectively.

The equivalent electrical circuit additionally contains the factors $m_B$ and $s_B$ as compared with the normal M-derived type. For the manufacture of constant K type filter by combination of the factors $m_B$, $s_B$ with $m_C$, $s_C$, the width $h$ of the resonator 16 should be selected so as to be extremely larger than the width $ha$ of the coupler 17. However, when the difference between the width of the resonator 16 and that of the coupler 17 is not remarkably large, the influence due to the factors $m_B$ and $s_B$ is not too large, so that the constant K type is not established and the M-derived type filter is made possible.

The example in FIG. 9(c) corresponds to the electro-mechanical filter obtained by shortening the length 14 of the resonator 16 of the example in FIG. 9(a). When the filter in FIG. 9(c) is used, the influences due to $m_B$ and $s_B$ in FIG. 9(b) can be more remarkably reduced.

The characteristic curve in FIG. 10 indicates frequency-attenuation characteristic of the M-derived type electro-mechanical filter. The said curve indicates that the frequencies $f_{-\infty}$ and $f_\infty$ have, respectively, attenuation poles.

As will be clearly understood from the above description, since the transducers and resonators of the electro-mechanical filter of this invention are made of quartz crystal vibrator, frequency adjustment in the case of manufacture of the elements become very easy and accurate and, particularly excellent temperature characteristic and aging characters are obtained.

While we have described particular embodiments of our invention, it will, of course, be understood that we do not intend it to be limited thereto, since many modifications may be made and we, therefore, contemplate by the appended claims to cover all such modifications as fall within the true spirit and scope of our invention.

We claim:

1. An electro-mechanical wave filter comprising a shaped solitary body having input-and-output transducer-plates with at least one intermediate resonator plate and a single rod coupled between said transducer plates, said at least one resonator having two free ends and being coupled from a point of dissymmetry of said resonator intermediate said free ends and separated from its vibration nodal point to said single rod.

2. An electro-mechanical wave filter as claimed in claim 1, further comprising electrodes on the rear and front surfaces of said transducer plates.

3. An electro-mechanical wave filter comprising a shaped solitary body having input-and-output transducer-plates with at least one intermediate resonator plate and a central rod coupled between said plates, said at least one resonator coupled at a point of dissymmetry of said resonator to said central rod, wherein said at least one intermediate resonator comprises a first portion perpendicular to said central rod, second portions parallel to said central rod, said first portion being coupled between points of dissymmetry on said second portions.

References Cited in the file of this patent

UNITED STATES PATENTS

| | | |
|---|---|---|
| 1,644,004 | Zobel | Oct. 4, 1927 |
| 1,781,469 | Mason | Nov. 11, 1930 |
| 1,954,516 | Bourne | Apr. 10, 1934 |
| 2,276,013 | Bohannon | Mar. 10, 1942 |
| 2,342,869 | Kinsley | Feb. 29, 1944 |
| 2,345,491 | Mason | Mar. 28, 1944 |
| 2,570,579 | Masters | Oct. 9, 1951 |
| 2,596,460 | Arenburg | May 13, 1952 |
| 2,814,785 | Burns | Nov. 26, 1957 |
| 2,821,686 | Burns | Jan. 28, 1958 |
| 2,906,973 | Mason | Sept. 29, 1959 |

FOREIGN PATENTS

| | | |
|---|---|---|
| 244,560 | Italy | Feb. 3, 1926 |